Patented Dec. 13, 1932

1,891,168

UNITED STATES PATENT OFFICE

ARTHUR LUETTRINGHAUS, OF MANNHEIM, AND HEINRICH NERESHEIMER AND WILHELM SCHNEIDER, OF LUDWIGSHAFEN-ON-THE-RHINE, GERMANY, ASSIGNORS TO GENERAL ANILINE WORKS INC., OF NEW YORK, N. Y., A CORPORATION OF DELAWARE

PRODUCTION OF DERIVATIVES OF NAPHTHALENE

No Drawing. Application filed June 10, 1929, Serial No. 369,917, and in Germany July 11, 1928.

The present invention relates to the production of derivatives of naphthalene and anthracene.

It has been proposed to condense 1 molecular proportion of p-benzoquinone with 2 molecular proportions of 1.3-butadienes to form cyclic di-ketones, containing the carbon skeleton of anthracene. The most elementary representative probably has the following constitution:

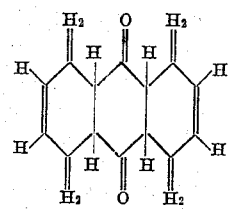

We have now found that new condensation products can be obtained from p-benzoquinones and 1.3-butadienes, containing the carbon skeleton of naphthalene and sharply distinguished from the beforementioned condensation products, if a p-benzoquinone substituted in the 2- or in the 2- and 3-positions, which substitution products are meant to comprise also such derivatives of p-benzoquinones as are substituted in the 2- and 3-positions by only one partly or completely hydrogenated nucleus, is condensed with a 1.3-butadiene hydrocarbon, or if a p-benzoquinone which has not been substituted is brought into reaction with a 1.3-butadiene hydrocarbon under conditions which are milder than those necessary for the formation of the di-ketones derived from anthracene. Such mild conditions are, for example, low temperature, short duration of the reaction, a smaller amount of butadiene than corresponds to 2 molecular proportions of 1.3-butadiene to 1 molecular proportion of p-benzoquinone, and so on.

The simplest representative of the new condensation products probably has the following constitution:

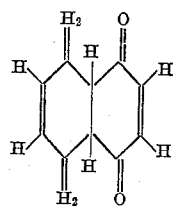

They are readily soluble in organic solvents and in aqueous caustic alkali giving yellow solutions, which become dark on exposure to the air. As far as they have been obtained from benzoquinone itself they can be further condensed with one molecular proportion of the same or of another 1.3-butadiene hydrocarbon to form products containing the carbon skeleton of anthracene, which may be converted into anthraquinones and derivatives thereof by the process described in the application Ser. No. 360,324, filed May 3, 1929. The condensation products containing the carbon skeleton of naphthalene undergo hydrogen displacement, when heated alone or in the presence of a diluting agent or, when treated with agents having an acid or alkaline reaction. The products of hydrogen displacement thus obtained can be converted into 1.4-naphthoquinones by dehydrogenation. In carrying out this process under milder conditions, well defined intermediate products can be obtained. Thus, for example, by the mild interaction of the dehydrogenating agents the displacement product of the condensation product of 1 molecular proportion of benzoquinone and 1 molecular proportion of 1.3-butadiene at first yields a compound of a quinhydronic character; by further dehydrogenation a quinone is obtained, which by its analytical data and reactions is a dihydrogenated naphthoquinone, and the fact that on more energetic dehydrogenation, the 1.4-naphthoquinone is obtained bears this out.

The reaction probably proceeds according to the following formulæ:

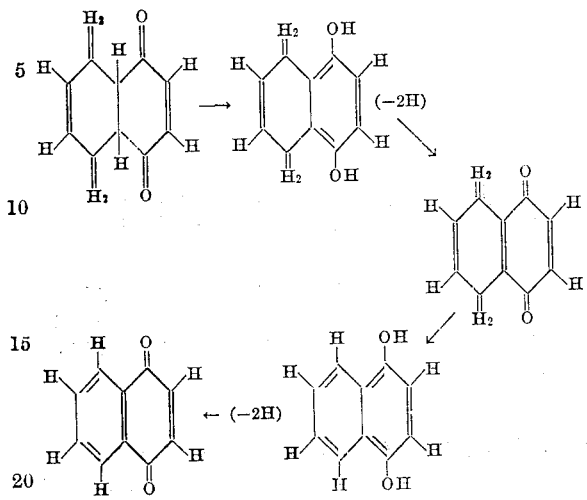

Thus in accordance with the present invention the 5.8-dihydro-1.4-dihydroxynaphthalenes which have not yet been described may be obtained, further hitherto unknown 5.8-dihydro-1.4-napthoquinones and 1.4-naphthoquinones, which could not be prepared according to the methods hitherto known, may also be obtained. Several or all of the aforesaid conversions may be carried out in a single operation. The 5.8-dihydro-1.4-dihydroxynaphthalenes dissolve in aqueous solutions of caustic alkalies or alkali carbonates forming colorless solutions which quickly assume yellow and then brown shades owing to the influence of atmospheric oxygen.

The 5.8-dihydro-1.4-napthoquinones generally dissolve, just as benzoquinone, in aqueous alkaline liquids in contact with air to dark colored solutions, from which they can no longer be separated in an unaltered condition by means of acids. The reactions of the new derivatives of the 1.4-naphthoquinone, obtainable according to the present process, are similar to those of the unsubstituted 1.4-naphthoquinone.

The new products may be employed as intermediate products in the production of coloring matters and medical preparations.

The following examples will further illustrate how the invention is carried out in practice, but the invention is not limited to these examples. The parts are by weight.

*Example 1*

A mixture of 10 parts of p-benzoquinone and 8.5 parts of 1.3-butadiene is slowly heated under pressure to a temperature ranging from 60° to 65° C. which temperature is maintained for some time. After cooling, the nearly colorless crystalline mass is triturated with a little ether and filtered by suction. The residue is recrystallized from petroleum ether. The new product forms faintly yellowish needles which easily dissolve even in low boiling organic solvents. When dissolved in caustic alkalies, yellow solutions are obtained, which become dark on exposure to the air.

*Example 2*

10 parts of toluquinone are heated with 5 parts of 1.3-butadiene for several hours to from 60° to 65° C. The product separating out after cooling in brownish crystals, crystallizes from petroleum ether in nearly colorless needles and is very similar to the compound described in Example 1, which bears no methyl group.

*Example 3*

10 parts of the condensation product obtained according to Example 1 are heated for some time to 100° C. with 10 parts of 1.3-butadiene. The product, separated out after cooling in long colorless needles, is triturated with a little ether and, if necessary, crystallized from carbon tetrachloride. It is identical with the condensation product obtainable from 2 parts of p-benzoquinone and 3 parts of 1.3-butadiene, heated in an autoclave for 3 hours to 100° C. If 30 parts of 2.3-dimethyl-1.3-butadiene are employed instead of the 1.3-butadiene, a condensation product of similar properties is obtained.

*Example 4*

8.2 parts of 2.3-dimethyl-1.3-butadiene are allowed to act for some time under pressure upon 10.8 parts of finely divided p-benzoquinone at about 30° C. The condensation product, obtained in the form of a nearly colorless crystalline mass, is recrystallized from ether and yields broad faintly yellow needles, the properties of which are very similar to those of the condensation product described in Example 1.

*Example 5*

A mixture of 10 parts of 5.8-dihydro-1.4-naphthoquinone obtainable according to the following Example 12 and 7 parts of 1.3-butadiene is heated under pressure for several hours at 70° to 80° C. On cooling, the condensation product crystallizes in nearly colorless needles. It dissolves easily even in low boiling organic solvents. From its analytical data and its production it probably has the following constitution

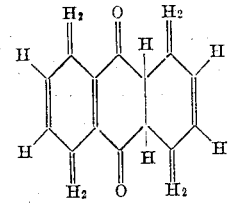

If 5.6.7.8-tetrahydro-1.4-naphthoquinone (see Berichte der Deutschen Chemischen Gesellschaft, vol. 23, page 1131) is employed instead of the 5.8-dihydro-1.4-naphthoquinone, a condensation product is obtained, which also separates out in nearly colorless crystals and is easily soluble in organic media.

Example 6

22 parts of p-benzoquinone are warmed for several hours at about 50° C. under pressure with 14 parts of isoprene. The reaction product, separating on cooling mostly in the form of crystals, readily dissolves in nearly all organic solvents even those of a low boiling point. It crystallizes in broad colorless needles from petroleum ether. The new condensation product probably corresponds to the formula:

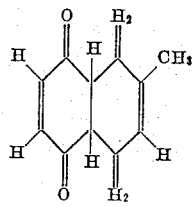

Example 7

A suspension of 20 parts of monochloro-p-benzoquinone in 10 parts of 2.3-dimethyl-1.3-butadiene is carefully warmed to about 40° C. and maintained at the said temperature until reaction takes place whereby the chlorobenzoquinone slowly dissolves. The temperature of the reaction mixture is kept at between 50° and 60° C. by cooling until the mixture solidifies to a faintly yellow crystalline mass. By recrystallizing the crude product from petroleum ether the new condensation product is obtained in the form of nearly colorless small needles probably having the constitution

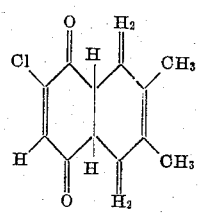

Example 8

10 parts of 2.3-dichloro-p-benzoquinone are treated under pressure for some time at 100° C. with 10 parts of 1.3-butadiene. The product separating on cooling in faintly yellow crystals crystallizes from carbon tetrachloride in the form of compact nearly colorless needles and according to analysis and its properties has the following constitution:

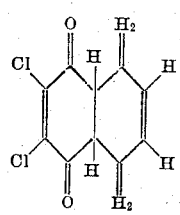

Example 9

10 parts of finely divided 2.3-dichloro-p-benzoquinone are acted upon in a closed vessel at room temperature with 5 parts of 2.3-dimethyl-1.3-butadiene. The yellow suspension slowly solidifies to a nearly colorless crystal pulp. The new product which probably corresponds to the formula:

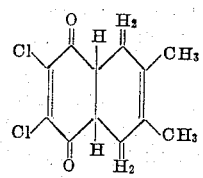

crystallizes from glacial acetic acid in long colorless needles. Its properties are very similar to those of the product described in Example 8.

Example 10

10 parts of the condensation product obtained by slowly heating a mixture of 10 parts of p-benzoquinone with 8.5 parts of 1.3-butadiene under pressure to from 60° to 65° C., which temperature is maintained for some time, and then purifying the product, are dissolved in a mixture of 20 parts of alcohol and 50 parts of water. Then 60 parts of hydrochloric acid are added and the reaction mixture is slowly heated to from 50° to 60° C. The 5.8-dihydro-1.4-dihydroxynaphthalene separates out in the form of an almost colorless crystalline paste. It dissolves in most of the organic solvents with much greater difficulty than the condensation product. It recrystallizes from carbon tetrachloride in the form of small colorless needles. With aqueous caustic alkalies or alkali metal carbonates colorless solutions are obtained, which darken quickly when exposed to the air.

The condensation product obtained from 1 molecular proportion of p-benzoquinone and 1 molecular proportion of 1.3-butadiene undergoes the same hydrogen displacement as that effected by treatment with hydrochloric acid, when heated above its melting point, for example to from 170° to 175° C.

Example 11

A suspension of 7 parts of the condensation product employed in Example 10 in 200 parts of a 3 per cent caustic soda solution is stirred at 50° C. for several hours, air being excluded. The resulting colorless solution after having been cooled to 10° C. is separated from small traces of undissolved by-products by filtration, also with the exclusion of air, and the filtrate allowed to run into a mixture of 50 parts of glacial acetic acid and 100 parts of water. 5.8-dihydro-1.4-dihydroxynaphthalene described in Example 10 separates out in a nearly pure state.

Example 12

A solution of 11 parts of ferric chloride in 100 parts of water is added to a solution of 5 parts of the 5.8-dihydro-1.4-dihydroxynaphthalene, obtained according to Example 10 or 11, in 100 parts of glacial acetic acid. The mixture is boiled until the whole amount of ferric chloride is reduced. The 5.8-hihydro-1.4-naphthoquinone separates out in small needles on cooling. The new product easily dissolves in most of the organic solvents. It crystallizes from petroleum ether or acetone in beautiful long yellow needles. On exposure to light it darkens, particularly rapidly when it is in a finely divided state. Instead of employing the 5.8-dihydro-1.4-dihydroxynaphthalene, the condensation product from 1 molecular proportion of p-benzoquinone and 1 molecular proportion of 1.3-butadiene, as employed in Example 10, can also be employed directly without first effecting hydrogen displacement.

If only half of the amount of ferric chloride solution necessary for the formation of the 5.8-dihydro-1.4-naphthoquinone is employed, for effecting dehydrogenation of the 5.8-dihydro-1.4-dihydroxynaphthalene, small needles of metallic lustre and bronze color separate out on cooling. The reaction product can easily be converted by further dehydrogenation into 5.8-dihydro-1.4-naphthoquinone described above and probably has a quinhydronic constitution.

Example 13

A solution of 6.6 parts of potassium bichromate in 200 parts of water is added to a warm solution of 5 parts of the 5.8-dihydro-1.4-dihydroxynaphthalene prepared according to Example 10, in 100 parts of glacial acetic acid. The reaction mixture is heated to boiling until all the bichromate is consumed. Yellow needles of 1.4-naphthoquinone separate out on cooling. The precipitation can be completed by adding a solution of common salt.

Example 14

A mixture of 60 parts of hydrochloric acid and 50 parts of water is added to a hot solution of 80 parts of alcohol and 10 parts of the condensation product obtained by treating 1 molecular proportion of finely divided p-benzoquinone and 1 molecular proportion of 2.3-dimethyl-1.3-butadiene under pressure at about 30° C. The 5.8-dihydro-6.7-dimethyl-1.4.-dihydroxynaphthalene is formed and at once separates out in the form of a thick colorless crystalline paste. It recrystallizes from monochlorobenzene in small colorless needles.

Example 15

5.9 parts of the 5.8-dihydro-6.7-dimethyl-1.4-dihydroxynaphthalene obtained according to Example 14, are dissolved in 100 parts of hot glacial acetic acid. A solution of 3.3 parts of potassium bichromate in 100 parts of water is added, the solution boiled for a short time and then diluted with 200 parts of water. The reaction product separates out on cooling in small yellowish needles. Its properties are very similar to those of the 5.8-dihydro-1.4-naphthoquinone, which has been described in Example 12; it is probably 5.8 - dihydro - 6.7 - dimethyl - 1.4 - naphthoquinone.

Example 16

Twice the amount of the potassium bichromate solution employed in Example 15 is added to a solution of 5.9 parts of the 5.8-dihydro-6.7-dimethyl-1.4-dihydroxynaphthalene, obtained according to Example 14, in 100 parts of glacial acetic acid. The mixture is boiled for some time and then 100 parts of water are added. Small yellow needles of a quinone separate out on cooling, which quinone is different from that described in Example 15, but with regard to its reactions, is very similar to the 1.4-naphthoquinone. The same compound can also be obtained from the 5.8-dihydro-6.7-dimethyl-1.4-naphthoquinone, which has been described in Example 15, by dehydrogenation, for example with potassium bichromate. In view of its formation and its reactions it may be regarded as 6.7-dimethyl-1.4-naphthoquinone.

Example 17

10 parts of the condensation product obtained from 1 molecular proportion of 5.8-dihydro-1.4-naphthoquinone and 1 molecular proportion of 1.3-butadiene, according to Example 5 are dissolved in 50 parts of alcohol, a mixture of 50 parts of hydrochloric acid and 50 parts of water being then added to the hot solution. On cooling the 1.4.5.8-tetrahydro-9.10-dihydroxyanthracene, described in Example 30 of application Ser. No. 360,324 filed May 3, 1929, separates out in small needles which possess a bluish violet color probably because of the presence of a compound of a quinhydronic nature.

Example 18

10 parts of concentrated hydrochloric acid are added to a suspension of 2 parts of the product obtainable according to Example 2 in a mixture of 1 part of ethyl alcohol and 1 part of water. The reaction mixture is stirred until it solidifies to a colorless pulp. The new product is filtered by suction, washed with water and recrystallized from benzene after drying it. It is obtained in the form of colorless needles having a much higher melting point than the initial material. It may be regarded as 2-methyl-5.8-dihydro-1.4-dihydroxynaphthalene.

*Example 19*

A mixture of 25 parts of water and 25 parts of pure hydrochloric acid are added to a warm solution of 5 parts of the product obtainable according to Example 6 in 40 parts of ethyl alcohol. After cooling, the reaction mixture is diluted with 300 parts of water. The product is then filtered by suction, washed until neutral and obtained in the form of small colorless needles by recrystallization from carbon tetrachloride. From its preparation and analytical data it is 6-methyl-5.8-dihydro-1.4-dihydroxynaphthalene.

*Example 20*

2 parts of 2-methyl-5.8-dihydro-1.4-dihydroxynaphthalene obtainable according to Example 18 are dissolved in 50 parts of glacial acetic acid and a mixture of 5 parts of potassium bichromate and 50 parts of water to which a little of pure sulphuric acid has been added, is introduced into the said warmed solution. The product crystallizing in golden yellow needles on cooling is 2-methyl-1.4-naphthoquinone according to analysis.

When employing 6-methyl-5.8-dihydro-1.4-dihydroxynaphthalene obtainable according to Example 19 instead of 2-methyl-5.8-dihydro-1.4-dihydroxynaphthalene, 6-methyl-1.4-naphthoquinone crystallizing from dilute acetic acid in golden yellow needles is obtained.

*Example 21*

A mixture of 10 parts of potassium bichromate, 50 parts of water and 0.5 part of pure sulphuric acid is added to a warm solution in 20 parts of glacial acetic acid of 2 parts of the condensation product of 1 molecular proportion of 2.3-dichloro-p-benzoquinone and 1 molecular proportion of 2.3-dimethyl-1.3-butadiene obtainable according to Example 9. The whole is then warmed for about 1 hour on the water bath and allowed to cool. The golden yellow crystal pulp separating out consists of pure 6.7 dimethyl-2.3-dichlor-1.4-naphthoquinone.

What we claim is:

1. As new article of manufacture 1.4-naphthoquinone corresponding to the formula:

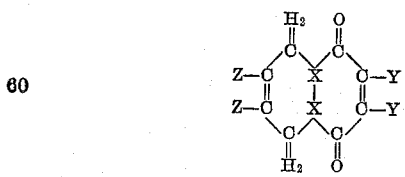

in which X stands for C or C—H, Y for H, halogen or $CH_3$ and Z for H or $CH_3$.

2. As new article of manufacture 1.4-naphthoquinone corresponding to the formula:

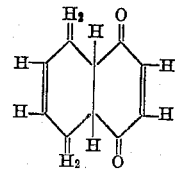

crystallizing from petroleum ether in the form of faintly yellowish needles and dissolving in aqueous solution of a caustic alkali to give a yellow solution becoming dark on exposure to the air.

3. As new article of manufacture 1.4-naphthoquinone corresponding to the formula:

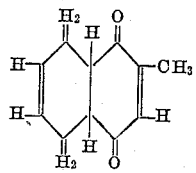

crystallizing from petroleum ether in the form of nearly colorless needles and dissolving in aqueous solution of a caustic alkali to give a yellow solution becoming dark on exposure to the air.

4. As new article of manufacture 1.4-naphthoquinone corresponding to the formula:

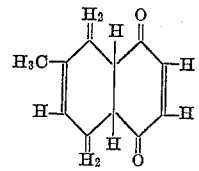

crystallizing from petroleum ether in broad colorless needles and readily dissolving in most organic solvents.

In testimony whereof we have hereunto set our hands.

ARTHUR LUETTRINGHAUS.
HEINRICH NERESHEIMER.
WILHELM SCHNEIDER.